No. 618,537. Patented Jan. 31, 1899.
J. A. CLARINGBURN.
KNITTING MACHINE.
(Application filed Dec. 24, 1897.)

(No Model.) 7 Sheets—Sheet 1.

Witnesses:
N. H. Robbins
E. Hume Talbert

Inventor:
Joseph A. Claringburn
by Jewell Davis
his Attorney

No. 618,537. Patented Jan. 31, 1899.
J. A. CLARINGBURN.
KNITTING MACHINE.
(Application filed Dec. 24, 1897.)
(No Model.) 7 Sheets—Sheet 3.
Fig 3
Fig 4
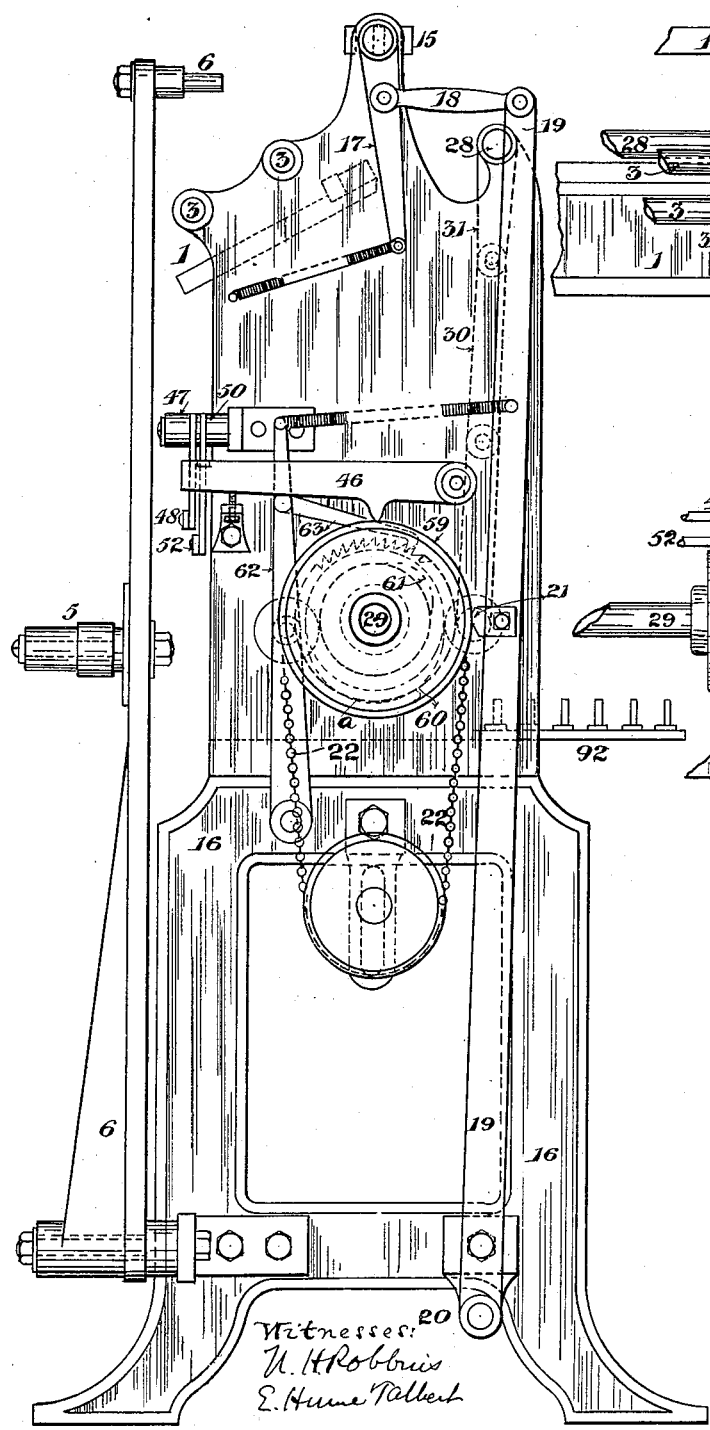
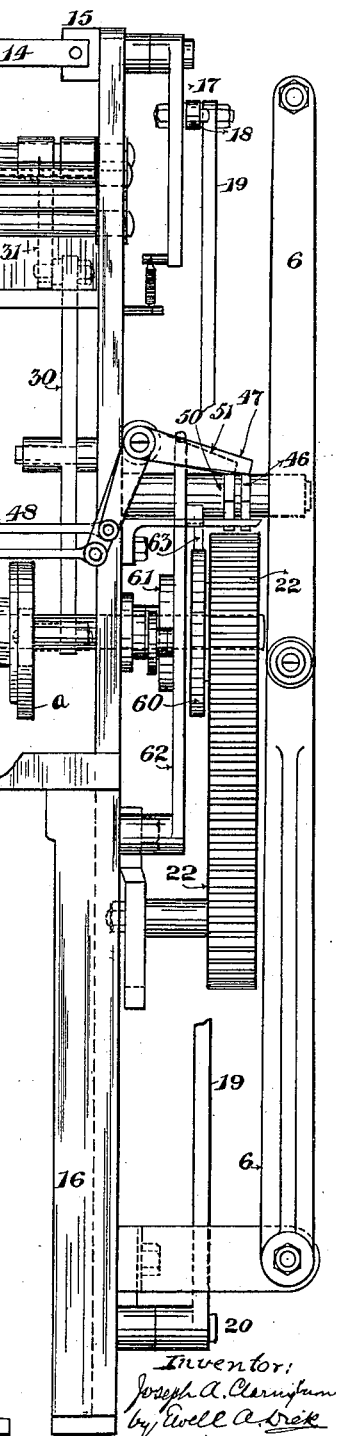

No. 618,537. Patented Jan. 31, 1899.
J. A. CLARINGBURN.
KNITTING MACHINE.
(Application filed Dec. 24, 1897.)
(No Model.) 7 Sheets—Sheet 4.

No. 618,537. Patented Jan. 31, 1899.
J. A. CLARINGBURN.
KNITTING MACHINE.
(Application filed Dec. 24, 1897.)

(No Model.) 7 Sheets—Sheet 6.

No. 618,537. Patented Jan. 31, 1899.
J. A. CLARINGBURN.
KNITTING MACHINE.
(Application filed Dec. 24, 1897.)
(No Model.) 7 Sheets—Sheet 7.
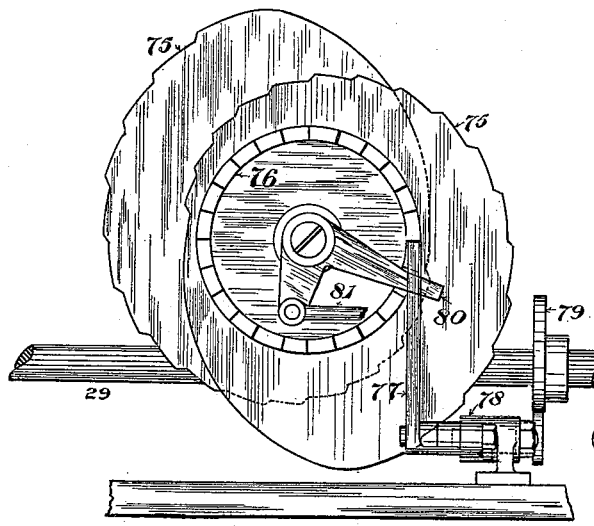
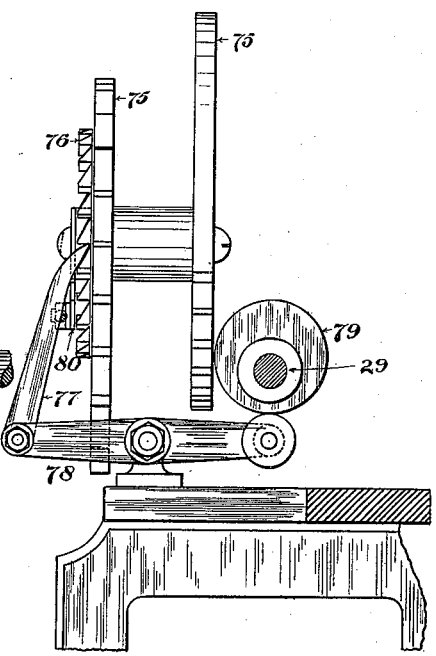
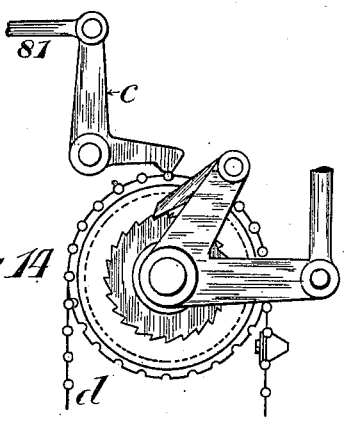

UNITED STATES PATENT OFFICE.

JOSEPH AUGUSTUS CLARINGBURN, OF NOTTINGHAM, ENGLAND.

KNITTING-MACHINE.

SPECIFICATION forming part of Letters Patent No. 618,537, dated January 31, 1899.

Application filed December 24, 1897. Serial No. 663,344. (No model.)

*To all whom it may concern:*

Be it known that I, JOSEPH AUGUSTUS CLARINGBURN, a subject of the Queen of Great Britain, residing at Nottingham, in the county of Nottingham, England, have invented certain new and useful Improvements in Knitting-Machines; and I do hereby declare the following to be a full, clear, and exact description of the invention, such as will enable others skilled in the art to which it appertains to make and use the same.

This invention relates to improvements in and applicable to straight-latch-needle knitting-machines fitted with movable sinkers and warp-thread guides, and has for its object the provision of means for enabling the machine to produce plain or striped fashioned work with warp-threads incorporated therein, improvements in the arrangement of and in the means controlling the action of the warp-thread guides and knitting-thread carriers, means for automatically throwing the additional needles into and out of action, and improvements in the construction and general arrangement of the machine.

Figure 1:
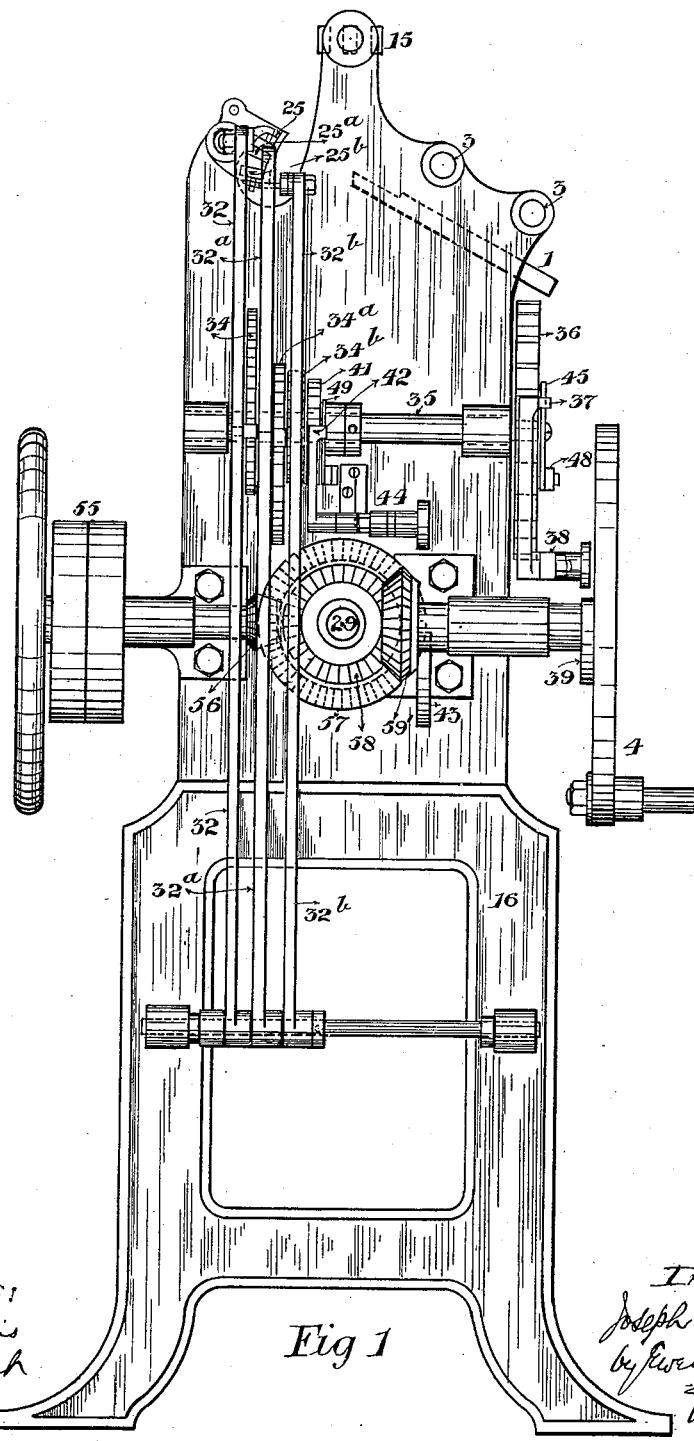
Figure 2:
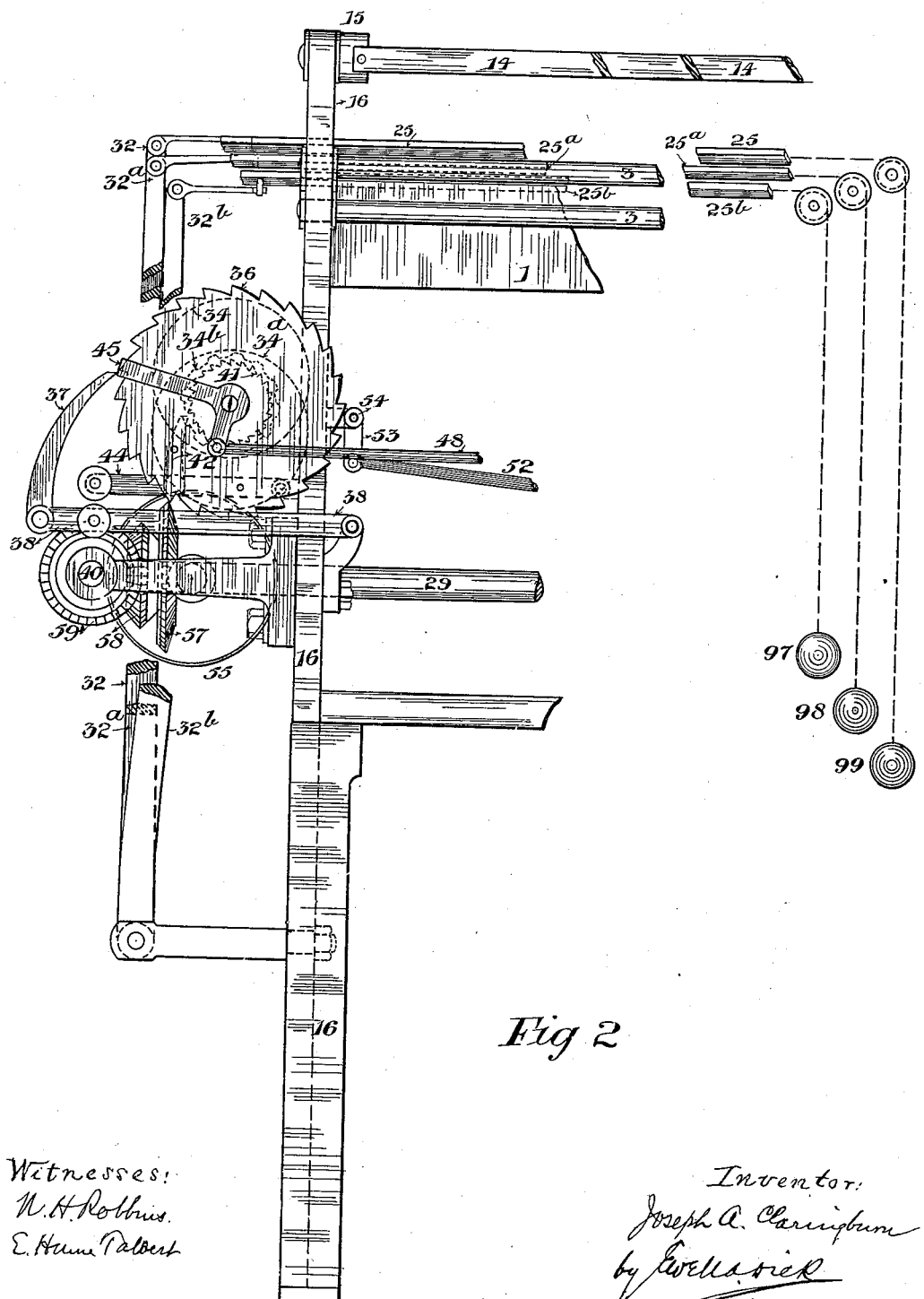
Figure 5:
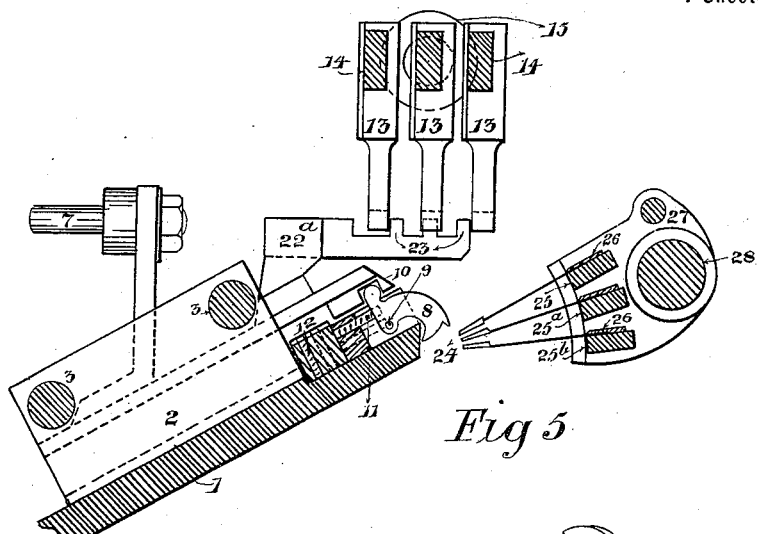
Figure 6:
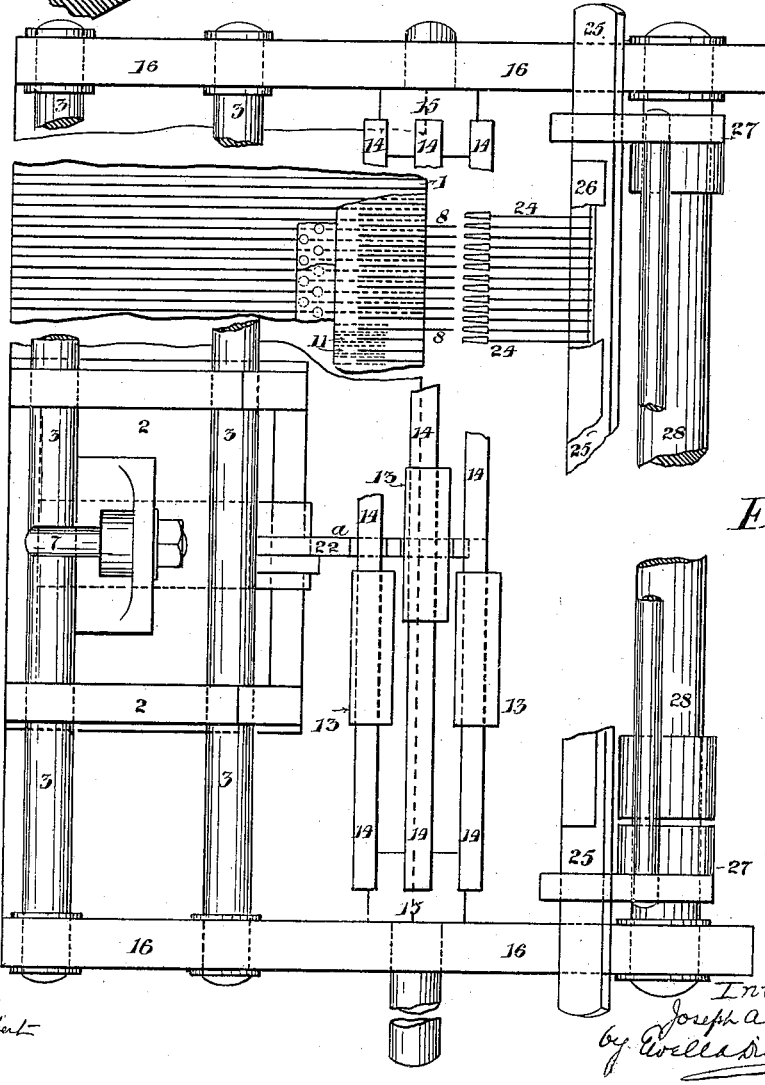
Figure 7:
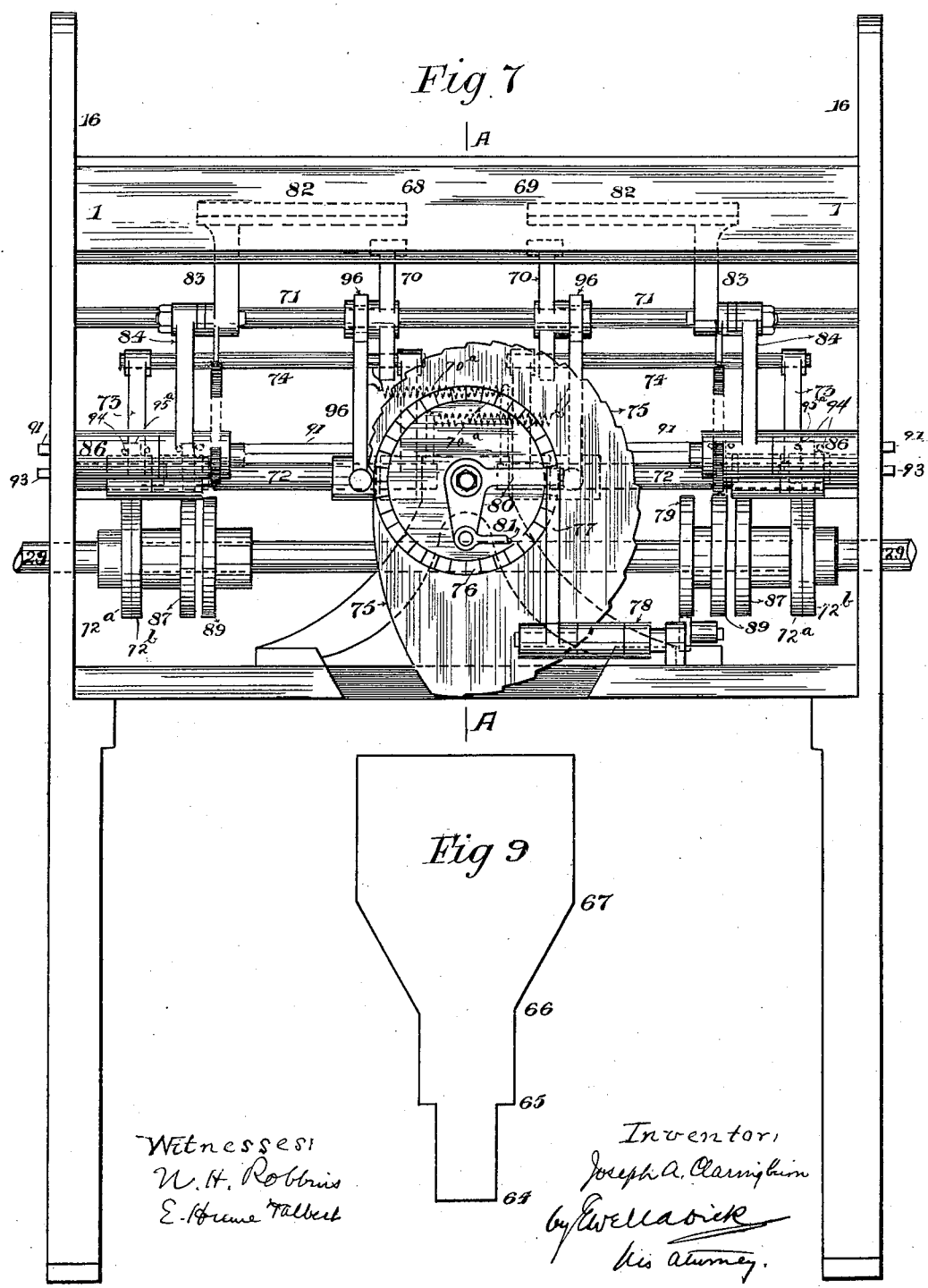
Figure 8:
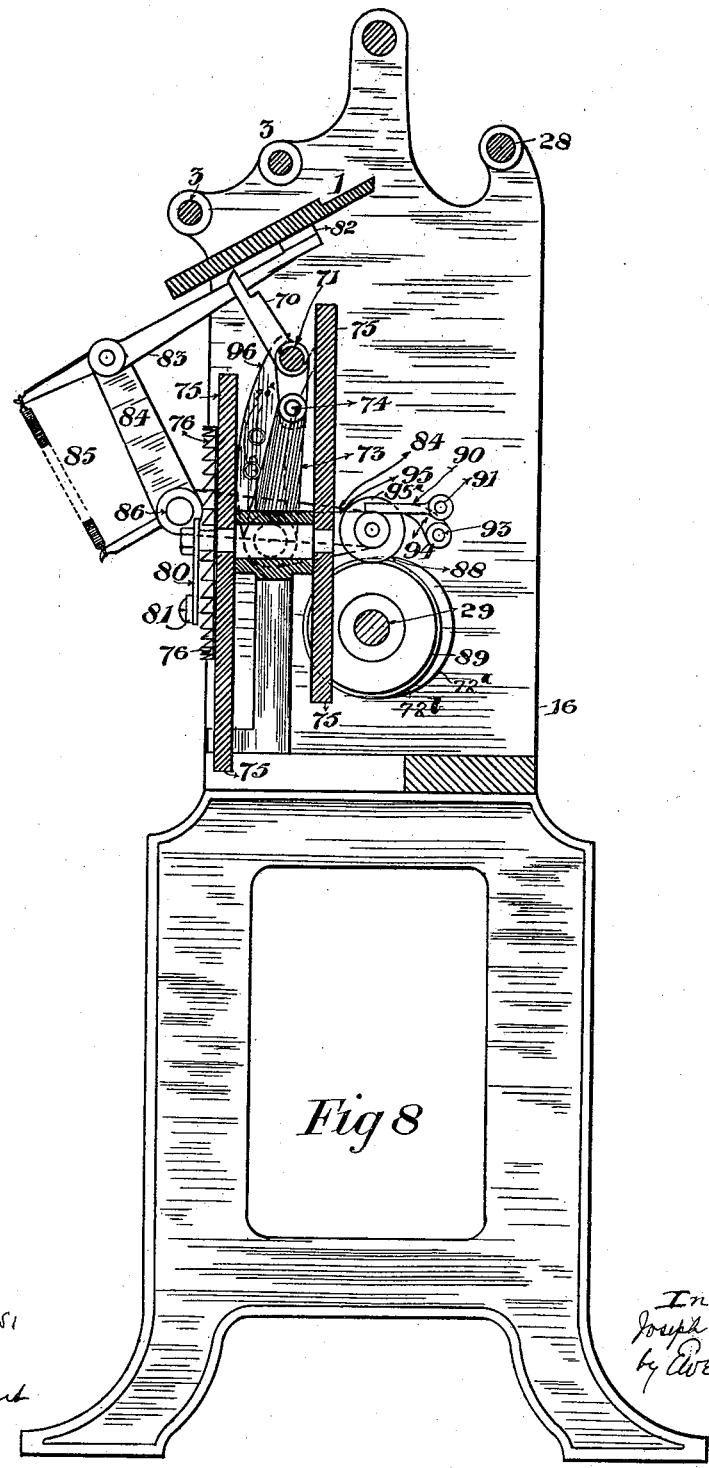

In the accompanying drawings, which are referred to in the following detailed description, Figure 1 is an elevation of the right-hand end of the machine. Fig. 2 is a side elevation of the mechanism shown in Fig. 1 with parts broken away or omitted. Fig. 3 is an elevation of the left-hand end of the machine. Fig. 4 is a side elevation of the mechanism shown in Fig. 3 with parts broken away or omitted. Fig. 5 is a section through the needle-bed, showing the sinkers, warp-thread guides and bars, and the knitting-thread carrier-bars, boxes, and driving mechanism. Fig. 6 is a plan of the mechanisms shown in Fig. 5. Fig. 7 is a back elevation of the machine, showing the mechanism for automatically throwing additional needles into and out of action. Fig. 8 is a section on the line A A, Fig. 7. Fig. 9 is a diagram referred to in the explanation of the method of knitting a stocking. Fig. 10 is an elevation of an ordinary needle and jack or stem. Fig. 11 is an elevation of a fashioning-needle and jack or stem. Fig. 12 is a front elevation of the ratchet mechanism for rotating the fashioning-cams. Fig. 13 is an end elevation of the above, and Fig. 14 is an elevation of a suitable arrangement of pattern mechanism.

The needle-bed 1 is grooved on its upper side for the reception of wire needles or jacks to which the needles are attached, all of such needles or their jacks being provided on the upper side with a heel or butt against which the inclines of the knitting-cam act, while the stems or jacks of the needles which are thrown into and out of work are also provided with a second heel or butt upon which the lifting-lever or other mechanism acts. (See Figs. 10 and 11.)

The knitting-cam box 2 is guided by rods 3 and is traversed across the needle-beds by a crank 4 through a link 5, lever 6, and a link between the lever 6 and an axle 7 on the cam-box 2. The lever 6 may in certain cases be dispensed with, and the crank is then coupled to the cam-box direct.

The sinkers 8 are preferably of the shape shown in Fig. 5 and act as sinkers, knocking-over bits, and for holding down the work. The sinkers are pivoted at 9 and are operated by a cam carried by the knitting-cam box, and there are springs in the holes 11, pressing forward the sinkers. There are also springs 12, which press upon the needles to produce the required friction.

The machine herein described is fitted with three thread-carriers and mechanism for selecting and actuating any one of the three. The carriers are attached to boxes 13, which are fitted to slide on bars 14, which are connected at the ends to blocks 15, capable of oscillating in bearings on the standards 16. At one end of the machine the axle of the block 15 is prolonged beyond the standard and is fitted with a lever 17, which is coupled by a link 18 to a lever 19, which is fulcrumed at 20 and is operated by bits on a pattern-chain 22 through a nose 21. For traversing the selected thread-carrier there is an arm $22^a$, fixed to the cam-box 2 and provided with projecting pieces 23, so arranged in conjunction with the thread-carrier boxes that the selected carrier-box is turned into the path of its particular driving-piece 23, or the boxes are so turned that the arm $22^a$ traverses without a carrier, this latter operation being for the purpose of knocking off the work at the completion of an article. The different motions given to the lever 17 for selecting the thread-carriers are obtained from pattern-pieces of different sizes on the pattern-chain 22.

This machine is also fitted with three sets of warp-thread guides 24, secured to bars 25, 25ª, and 25ᵇ by caps 26. These bars 25, 25ª, and 25ᵇ are fitted to slide in brackets 27, which are mounted on a shaft 28, and the three sets of guides are oscillated together from a cam $a$ on the cam-shaft 29 through a lever 30 and a slotted arm 31 on the shaft 28. The three sets of guides oscillate together, but each set is moved endwise independently of the others. This is effected by the mechanism shown in Figs. 1 and 2. The bars 25, 25ª, and 25ᵇ are coupled to levers 32, 32ª, and 32ᵇ, respectively, and these latter are moved in one direction by pattern-wheels 34, 34ª, and 34ᵇ and in the opposite direction by weights 97, 98, and 99, acting through connecting-cords. In the arrangement shown the pattern-wheels 34 and 34ª are fixed upon the shaft 35, which is intermittently rotated by a ratchet-wheel 36 and pawl 37 from a cam 39 on the shaft 40 through a lever 38. The pattern-wheel 34ᵇ is attached to a ratchet-wheel 41, which is free to rotate on the shaft 35 and is intermittently actuated by a pawl 42 from a cam 43 on the shaft 40 through a lever 44. The pawl 37 for the wheel 36 can be held out of action by a lever 45, which is shaped to hold the pawl out of the teeth and is actuated from the pattern-chain 22 through levers 46 and 47 and link 48. The pawl 42 can also be held out of action, as desired, by a lever 49, which is similar to the lever 45 and is actuated from the pattern-chain 22 through levers 50 and 51, link 52, lever 53, rocking shaft 54, and connections between the latter and lever 49.

The machine is provided with fast and loose pulleys 55, which drive the wheel 57 and shaft 29 through a pinion 56. To the wheel 57 there is fastened another wheel 58, which drives the crank 4 through the pinion 59'. The pattern-chain is carried by a chain-wheel 59, to which there is attached a ratchet-wheel 60. Both wheels are free to revolve on the shaft 29 and are rotated by a cam 61, which is fixed to the shaft 29 and gives motion to the wheels 59 and 60 through a lever 62 and clawker 63.

In knitting a stocking with a fashioned leg according to this invention the stocking is commenced at the line 64, Fig. 9, and a parallel piece of work is knitted for the upper part of the stocking-foot. When this is completed, a number of additional needles are automatically and simultaneously thrown into work at the line 65, either both sides together or successively, and the work is made wide enough for the ankle until the fashionings for the calf of the leg are reached at 66. The needles are then automatically thrown into action one at a time on opposite sides alternately until the line 67 is reached, when parallel work is made to complete the leg.

The mechanisms for throwing the additional needles into and out of work are shown in Figs. 7 and 8, from which views those parts of the machine already described are omitted. The needles with the heels or butts on one side, as represented in Fig. 10, are placed in the center part of the needle-bed, and there are as many needles as are required for the width of the stocking at the line 64, Fig. 9. On both sides of the center needles there are other needles with heels or butts on both sides of the stems or jacks, as represented in Fig. 11, and the total number of needles in the needle-bed is at least sufficient to knit the full width of the stocking, as at the line 67, Fig. 9. In the machine shown the center needles occupy the space 68 to 69, and these needles are always in position to be actuated by the knitting-cam.

For throwing the additional needles into work there are two lifters 70, and each one is wide enough to lift into action simultaneously the whole number of needles added at each side of the article at the line 65, Fig. 9. These lifters are fitted to oscillate and slide upon a shaft 71 and receive their oscillating movement from shafts 72, which are independently operated at different times from cams 72ª on the cam-shaft 29 and suitable levers 95, these cams being brought into action by the pattern-chain through a rod 93 and forks 94, which move the cam-trucks 95ª onto the cams 72ª from circular disks 72ᵇ. The shaft 72 makes one revolution for each to-and-fro traverse of the knitting-cam, and by placing the cams 72ª with the acting parts of the same on the opposite sides of the shaft a correct timing of the cams is obtained. Each shaft 72 carries two levers 73, to which there is attached a rod 74, and this rod passes through slots in the ends of the lifters 70. For traversing the lifters 70 on their shafts 71 the machine is provided with two stepped cams 75, which are mounted on the same axle and intermittently rotated by a ratchet-wheel 76, pawl 77, and cam-lever 78 from a cam 79 on the shaft 29; as shown in Figs. 12 and 13, the cams 75 acting upon arms 96 which slide upon the shafts 72 and are forked at their upper ends to enter a groove in the boss of the levers 70. There is also a bluff 80, which is connected by the link 81 to a lever $c$, actuated by a pattern-chain $d$, Fig. 13, so that the movement of the cams 75, and consequently the traverse of the lifters, can be stopped and started according to the size of the article being knitted. The pattern-chain arrangement shown in Fig. 13 may also be used for actuating the rods 91 and 93, Figs 7 and 8. After an article has been completed it is necessary to throw out of work the extra needles thrown into work during the knitting of the article. This is done by catch-bars 82, which are carried by levers 83, fulcrumed on other levers 84 and held in contact with the under side of the needle-bed by springs 85. The levers 84 are pivoted on pins or axles 86, fixed to the standards, and are actuated by cams 87 on the shaft 29, the cam-trucks 88 being moved from the circular disks 89 to the cams 87 by forks 90, which are carried by rods 91 and actuated by pattern mechanism.

With a machine constructed as herein described it is possible to make a plain or striped fashioned stocking-leg with an ornamental pattern on the whole or any part of the same, and the pattern may be varied by means of the pattern-wheels 34, 34$^a$, and 34$^b$, which are cut according to the well-known method. The pattern-wheels 75 are racked for each additional needle thrown into action on both sides of the needles in work, and the number of faces on the same depends upon the number of fashionings required and the number of motions required for the lifters to return to their original position.

In addition to the parts described the machine is provided with any suitable thread tension and take-up device, a stand 92 for the warp-thread bobbins, and with other accessories usual with this class of machine.

After the pattern wheels and chains have been adjusted and the warp and knitting-thread guides threaded the machine is started, the knitting-cam box traversing the full width of the machine, although the center set of needles only are in the knitting position. When the line 65, Fig. 9, is reached, the rod 93 is operated and the cam-trucks moved onto the operating-cams on the shaft 29, and as this shaft makes one revolution for a to-and-fro traverse of the cam-box both cam-trucks can be shogged simultaneously. Then when the knitting-cam box is at the right-hand end of its traverse the right-hand lifter is operated and the needles necessary to make up the width 65 on the right-hand side of the center needles are thrown into action. When the cam-box is at the left-hand end of the machine, at the next succeeding traverse the left-hand portion of the needles are thrown into action and the lifters may then be stopped, or they may continue to oscillate, but must not be traversed while the parallel portion of the stocking between the lines 65 and 66 is being knitted, and this length is varied according to the size of the stocking being knitted. The line 66 represents the commencement of the calf and the line where the fashionings commence, and at each fashioning the bluff 80 is moved clear of pawl 77, which then engages with the teeth of the ratchet-wheel 76 and rotates it one tooth. The wheel 76 being fastened to the shaft carrying the cams 75 rotates these latter, and the lifters 70 are moved from each a distance of two needles—that is, one on each side. At the next oscillation of the lifters an extra needle is thrown into work at each side of the needles on which work is actually being made. There may be one or more courses between each course in which the additional needles are thrown into work, and the traversing movements of the lifters may take place at any time during the traverse of the knitting-cam box; but the oscillation of the lifters must take place after the knitting-cam box has passed the needle to be thrown into action and is moving toward the end of its traverse. When all the additional needles have been thrown into work, the rotation of the cams 75 is continued, and the lifters are drawn back to their starting position by springs 70$^a$, Fig. 7, or weights, or by grooves in the cams, which are shaped, as shown, to allow of this return motion, and when the lifters have been brought to their starting position the pawl 77 is thrown out of action and the oscillation of the shafts 72 is stopped. The article is then completed and the thread-carriers moved so as to miss the driving-piece 23, the work being thereby knocked off the needles. At the same time the catch-bars 82 are thrown into action, and when the cam-box is at the right-hand side of the center needles the left-hand catch-bar operates to move out of the work the extra needles at the left-hand side of the machine, and when the cam-box is at the left-hand side of the machine the right-hand set of needles are similarly thrown out of work.

In this machine the needles advance to receive the knitting-thread and are then withdrawn to form the new loop. The needles afterward come forward until the loops on them rest on the needle-latches, and when the knitting-cam is at the extremity of its stroke the warp-guides rise between the needles, are moved endwise to wrap each of the threads about a needle, and then fall below the needles, in which position they may be again moved endwise for selecting the needles to be next wrapped.

What I claim as my invention, and desire to secure by Letters Patent, is—

1. In a latch-needle knitting-machine provided with a center set of needles, two side sets of fashioning-needles, and movable sinkers, the combination therewith of two or more sets of warp-guides, mechanism for oscillating the said guides, mechanism for traversing each set of guides independently of the other, two or more knitting-thread carriers, mechanisms for selecting and traversing the knitting-thread carriers, and mechanism for automatically throwing the fashioning-needles into and out of their knitting position, substantially as set forth.

2. In a latch-needle knitting-machine provided with a center set of needles, and two sets of fashioning-needles, the combination therewith of a plurality of sets of warp-thread guides, oscillating and sliding bars on which said thread-guides are mounted, a cam-and-lever mechanism by which said bars are oscillated, pattern-wheel and lever mechanism by which the bars are slid endwise in one direction and weights and cords by which they are slid in the opposite direction, a plurality of thread-carriers, and means for traversing such thread-carriers, substantially as set forth.

3. In a latch-needle knitting-machine provided with a center set of needles, two sets of fashioning-needles, and movable sinkers, the combination therewith of a plurality of sets of warp-thread guides, and mechanism for oscillating and traversing the same, a plurality of knitting-thread carriers and mechanism for selecting and traversing the same, lifter-levers for throwing the fashioning-needles into a knitting position, cams for traversing the said levers, and pattern-controlled mechanism for actuating the said cams, substantially as set forth.

4. In a latch-needle knitting-machine provided with a center set of needles, two sets of fashioning-needles and movable sinkers, the combination therewith of a plurality of sets of warp-thread guides, mechanism for oscillating and traversing the same, the thread-carriers and mechanism for selecting and traversing them, fashioning-needle lifters and mechanism for operating the same, bars for lowering the fashioning-needles out of their operative position, springs which hold said bars in position to operate upon the said needles, levers carrying the said bars, and mechanism for operating the levers, substantially as set forth.

5. In a latch-needle knitting-machine, the combination of the needles, the knitting-cam for actuating the needles, warp-thread guides, mechanism for oscillating and traversing such guides, thread-carriers and mechanism for selecting and driving the same, lifters for raising the needles into their operative position and mechanism for oscillating and traversing the same, catch-bars for lowering the needles from their operative positions and mechanism for operating the same, and pattern mechanisms controlling the movements of the above-mentioned mechanisms, substantially as set forth.

JOSEPH AUGUSTUS CLARINGBURN.

Witnesses:
WILLIAM H. POTTER,
J. A. WHATNALL.